UNITED STATES PATENT OFFICE.

CARLETON ELLIS, OF MONTCLAIR, NEW JERSEY.

CATALYTIC MATERIAL AND PROCESS OF MAKING SAME.

1,151,003.     Specification of Letters Patent.     Patented Aug. 24, 1915.

No Drawing.     Application filed May 4, 1915. Serial No. 25,824.

*To all whom it may concern:*

Be it known that I, CARLETON ELLIS, a citizen of the United States, and a resident of Montclair, in the county of Essex and State of New Jersey, have invented certain new and useful Improvements in Catalytic Material and Processes of Making Same, of which the following is a specification.

This invention relates to catalyzers adapted for use in the hydrogenation or hardening of fatty oils or similar material and to the process of making such catalytic material and relates particularly to catalyzer comprising active nickel and the like derived by electrolytically depositing the metal as for example from a saline solution.

This invention contains matter disclosed in my copending application Serial No. 679,771 filed Feb. 24, 1912.

The object of the present invention is to obtain a catalyzer by depositing nickel by galvanic means so as to secure the metal in such an extended condition as to afford a very extensive surface for the action of hydrogen thereby enabling fatty oils containing unsaturated bodies such as olein to be saturated with hydrogen forming harder products of greater commercial value.

One embodiment of the present invention comprises the deposition of a metal such as nickel by electrolysis, as from a saline electrolyte, on a carrier or support which preferably has an affinity or absorptive capacity for hydrogen so that hydrogen may be occluded by the mass of supporting material thereby forming a storehouse of the gas for the active or more active surfaces. Such coöperating supporting material may be, for example, charcoal, graphite or other suitable form of carbon or it may be a metal such as nickel in a form which may be inactive or only slightly active as regards the property of transmitting hydrogen to oil or nickel; forming a hydrogen occluding support for the more active nickel material. The latter for example, may be in the form of a metallic sponge coated on charcoal particles, powdered graphite or a metallic support. In order to deposit nickel from solution in this manner preferably a current of relatively high density is employed. An electrolyte containing nickel sulfate or nickel ammonium sulfate may be employed, of preferably fairly weak concentration and to the mass there may be added a small amount about five per cent. or so of titanium salt. A nickel anode may be employed and the cathode may be a mass of powdered charcoal or graphite which is kept in motion during the deposition or the cathode may be of any other suitable material or support. A small amount of copper is sometimes desirable and this may be introduced into the electrolyte or otherwise. A small amount of zinc sulfate enables the production of a more spongy form of nickel. A mixed deposit of nickel and some titanium material may likewise be obtained which is efficient as a catalyzer. The titanium aids in modifying the character of the nickel so as to produce a greater measure of hydrogen absorption.

If any undesirable oxidation of the particles of catalytic material has occurred, these may be reduced by exposing to a current of hydrogen at say 350° C., or they may be reduced in oil by passage of a current of hydrogen therethrough at 250 to 275° C. In the latter case the presence of a small amount of copper or titanium apparently aids in the reduction or serves as an assistant in reduction. The material so prepared may be introduced into fatty oil heated to about 180° C. Hydrogen or a hydrogen containing gas is introduced and the oil hardened to a product of the desired melting point. The electrolytically-deposited catalyzer may be placed in a tower through which the oil is caused to flow while contact with hydrogen is effected and the hardened oil drawn off at the bottom of the tower in a continuous manner. Or the catalyzer may be agitated with the oil in the presence of hydrogen to produce a hardened product.

When the catalyzer becomes spent and inactive from use it may be regenerated by oxidizing and again reduced. If charcoal or other form of carbon is used as a supporting material the spent catalyzer may be ignited to burn off the charcoal and the metal or its oxidation product recovered and prepared again for use. When metallic nickel is the supporting material regeneration by solution in acid is not necessary.

The advantages of the electrolytic nickel or metal are several. Among these may be mentioned the tendency during the electrolytic deposition especially when using currents of high density to occlude more or less hydrogen in the nickel material which apparently is advantageous. Another advantage is the ability to obtain nickel in a very uniformly extended condition so that a relatively great surface is exposed, enabling a small amount of catalyzer to serve in hardening a large amount of oil. Another advantage is that the texture of the electrolytically deposited nickel is particularly suited as a source of catalytic material. By electrolysis under well regulated conditions, a very pure deposit of the metal is obtained. This often is difficult by wet methods involving washing of precipitates. By way of illustration it may be noted that nickel sulfate solution treated with alkali forms a precipitate which is very difficult to free from sulfates. If this precipitate with or without a carrier is not completely freed of sulfates by tedious washing and other special treatment sulfids may form on reduction with hydrogen at 350° or higher and the catalyzer will be poisoned. By the present method catalyzer is obtained without this serious contamination with sulfur so that an electrolyte such as nickel sulfate or nickel ammonium sulfate solution may be employed yielding efficient catalytic material cheaply.

When the catalytic material is carried on a support which is porous and the latter becomes impregnated with the material it is even more difficult to remove the occluding sulfate or basic sulfate which forms and the reduction of the latter to form sulfids when the raw catalytic material is exposed at high temperatures to a reducing gas yields a product which usually has very poor catalytic properties in fact so as to be incapable of use but once or twice and therefore being practically inoperative in comparison with catalyzers which are so free from poisons that they may be used daily for weeks or months without serious impairment of their catalytic properties.

The advantages of electrolytic deposition also embrace the point that the metal may be deposited in a finely extended condition without resorting to reduction by means of hydrogen at high temperatures with undesirable sintering of the product and consequent loss in catalytic value. When nickel hydrate or other material is subjected to an atmosphere of hydrogen but not in contact with oil or other liquid vehicle, ordinarily it is considered necessary to heat the finely divided material in such hydrogen atmosphere to a temperature of 400 to 500° C., and in some cases the catalyzer is prepared at a fairly strong red heat. This tends to cause sintering and agglomeration of the particles and in consequence the surface exposure is not sufficient. In other words, the material shrinks or compacts to form a product having too little superficial area to effectually yield the requisite catalytic properties for the purpose in hand. The extension of the catalyzer on a bulky carrier is a makeshift in the effort to obviate the disadvantages of sintering which arises during high temperature reduction of the catalytic material by itself.

Hydrogenated or hardened oil may be prepared from fatty animal or vegetable oils including corn, cottonseed, castor, Chinese wood oil, linseed, peanut, sesame, fish, cod whale or lard, tallow and greases of various descriptions. The process may be carried out in the manner above set forth using the catalytic material described herein, as for example in the method involving a conduit filled with catalytic material through which oil passes in contact with hydrogen preferably as a counter-current or the catalyzer may be agitated with the oil at temperature preferable of 170 to 190° C., in the presence of a hydrogen containing gas. The use of nickel without a carrier especially of the fullers' earth or kieselguhr type eliminates an objection to the catalytic process, namely that in many cases a pronounced clayey or disagreeable earthy taste is imparted to the oil by the latter which is difficult to remove requiring oftentimes drastic treatment with superheated steam and great expense to remove such disagreeable and objectionable taste or smell. The present catalyzer and process enables hardened oils to be made without such disagreeable flavor. It also avoids charging the oil with silica and iron or aluminum soaps which may form due to the action of certain clays at high temperatures. Lard compound may be prepared by hydrogenating, for example, cottonseed oil with a catalyzer comprising particles of electrolytic nickel material free from an inert or earthy carrier and from sulfates or sulfids giving lard or butter substitutes free from clayey or earthy taste and similarly, highly hardened oil made in this manner may be used to thicken cottonseed oil to the consistency of lard. Thus there is eliminated the exposure of the oil at high temperatures to clayey material.

What I claim is:

1. A catalyzer adapted for hydrogenating fatty oils comprising active electrolytic nickel in a highly extended form attached to hydrogen-occluding material.

2. A catalyzer adapted for hydrogenating fatty oils comprising active electrolytic nickel in a highly extended form.

3. A catalyzer adapted for hydrogenating fatty oils comprising an electrolytic metal in a highly extended form.

4. A catalyzer comprising active electrolytically deposited metallic nickel supported on a hydrogen occluding carrier.

5. A catalyzer comprising electrolytically deposited nickel material carried by a support capable of freely occluding hydrogen.

6. A catalyzer comprising electrolytically deposited nickel and another metal.

7. The process of making catalyzer which comprises electrolytically depositing nickel material and in forming a highly active catalytic surface thereon by reduction with hydrogen in an oily medium.

8. The process of making a catalyzer adapted for the hydrogenation of fatty oils containing unsaturated components which comprises electrolytically depositing nickel material and in forming a highly active catalytic surface thereon by reduction.

Signed at Montclair in the county of Essex and State of New Jersey this 3rd day of May A. D. 1915.

CARLETON ELLIS.

Witnesses:
 W. O. HENKE,
 ENID CURTIS.